United States Patent
Lee

(12) 
(10) Patent No.: US 6,456,278 B1
(45) Date of Patent: Sep. 24, 2002

(54) COMPUTER KEYBOARD WITH ACCU-PRESSURE POINTS

(76) Inventor: Sang G. Lee, 1059 S. Howard Blvd., Los Angeles, CA (US) 90006

( * ) Notice: Subject to any disclaimer, the term of this patent is extended or adjusted under 35 U.S.C. 154(b) by 193 days.

(21) Appl. No.: 09/617,006

(22) Filed: Jul. 14, 2000

(51) Int. Cl.[7] .................................................. G09G 5/00
(52) U.S. Cl. ...................................................... 345/168
(58) Field of Search ................................. 345/156, 157, 345/158, 159, 160, 168; 400/488, 489, 490, 491, 491.2, 493, 495, 495.1

(56) References Cited

U.S. PATENT DOCUMENTS

| | | |
|---|---|---|
| 546,896 A | 9/1895 | Lillard |
| 1,823,130 A | 9/1931 | Smith |
| 2,181,955 A | 12/1939 | Ward, Jr. |
| 2,947,404 A | 8/1960 | Siebels et al. |
| 3,625,204 A | 12/1971 | Sekiguchi ..................... 128/60 |
| 4,565,460 A | 1/1986 | Kline .......................... 400/490 |
| 5,290,115 A | 3/1994 | Little .......................... 400/491 |
| 5,813,777 A | 9/1998 | Bonnstauffer ................ 400/491 |
| 5,899,616 A | * 5/1999 | Caplan ......................... 400/489 |
| 6,005,496 A | * 12/1999 | Hargeaves et al. ........... 345/168 |
| 6,127,949 A | * 10/2000 | Dodd .......................... 345/168 |
| 6,183,149 B1 | * 2/2001 | Caplan ........................ 400/489 |

* cited by examiner

*Primary Examiner*—Vijay Shankar
(74) *Attorney, Agent, or Firm*—John K. Park; Park & Sutton LLP

(57) ABSTRACT

A key accu-pressure system comprising; a plurality of sensation needles attached to a surface, the sensation needles having a conical shape, an interior tip angle, a needlepoint and a shaft. The interior tip angle is less than about 60 degrees, and the interior tip angle is maintained to the needle point, the surface is a key, the key is attached to a keyboard, the key having an upper surface, an outer edge of the upper surface, a plurality of sides and a bottom surface. The plurality of needle points face generally upward and impact the fingers of a user when the keys are struck by the fingers, thereby creating an accu-pressure effect upon the fingers of the user, thereby relieving finger stress.

17 Claims, 2 Drawing Sheets

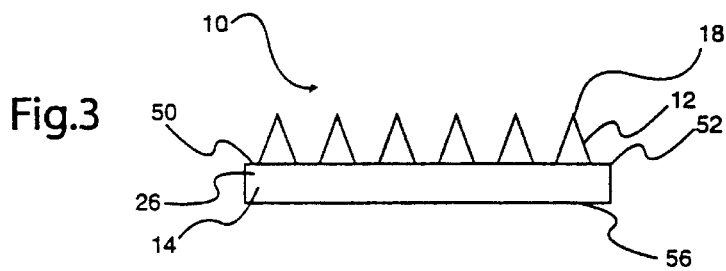
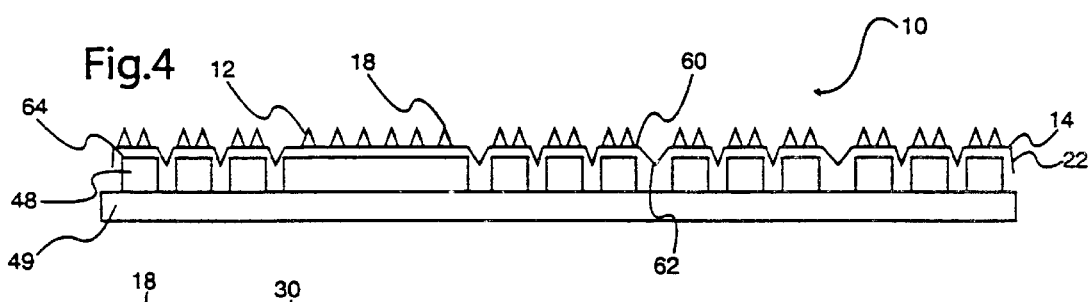
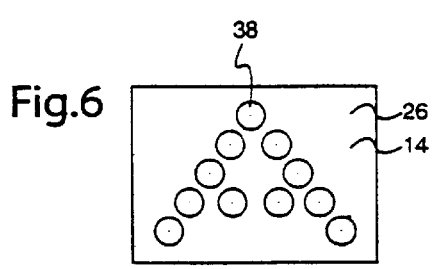
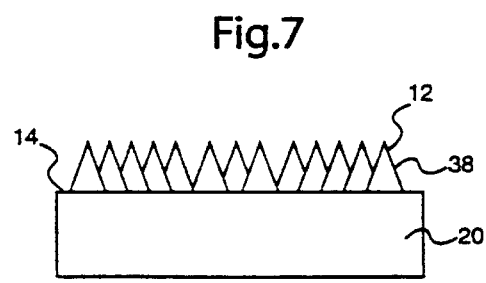
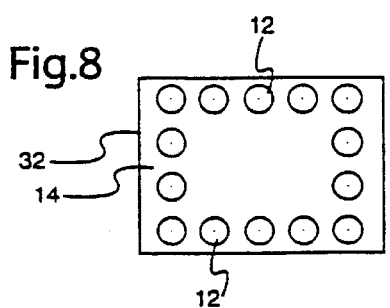
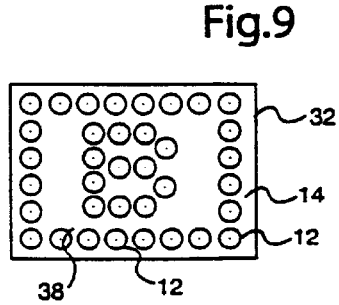

COMPUTER KEYBOARD WITH ACCU-PRESSURE POINTS

BACKGROUND OF THE INVENTION

The present invention relates to key systems and keyboards for reducing the stress to the fingers and body caused by repetitive depression of the keys on a keyboard. Computers, typewriters, data input devices, telephones and other communications devices all utilize keypads or keyboards for data input and control.

Modern society has seen a proliferation in the use of the above-mentioned devices with a corresponding increase in the stress associated with repetitive usage. Stress upon the eyes caused by computer screens is well documented in medical chronicals and a similar condition caused by stress to the fingers, hands and arms is increasingly being mentioned in medical journals. Carpal tunnel syndrome is becoming a common occurrence in employees who spend the majority of their time punching keys on a keyboard.

Various devices have been available in the past to address the stress created by repetitive key depression. Past devices include; cushioned keys pads, hollow key pads, keys that flex from side to side, rounded convex dimples, pluralities of tiny embossings and flexible prongs. Other devices are known to consist of basically familiar, expected and obvious configurations and shapes, either manufactured directly upon the keyboard or designed to be added to existing keyboards. There continues to be a need for an effective stress relieving keyboard, notwithstanding the plethora of designs encompassed by the prior art that have been developed for the fulfillment of numerous objectives and purposes.

Many of the devices seek to cushion or soften the impact of the fingers when striking the key surface, thus minimizing the force and stress transferred to the finger. None of the known prior art devices provide a strong stimulation to the finger, which would serve to neurologically alleviate the stress created by the repeated depression of keys.

Therefore, it can be appreciated that there exists a need for a new and improved stress relieving key system to reduce and alleviate the stress created by repetitive key depression. The key system should be available on new keyboards and adaptable to existing keyboards and keys. In view of such objectives the present invention substantially fulfills that requirement.

SUMMARY OF THE INVENTION

An objective of the present invention, the key accu-pressure system, is to stimulate the neurological accu-pressure points of the users finger. In furtherance of this stress relieving objective, the keyboard is designed to release finger fatigue of the keyboard user by accu-pressure effect.

Because of the serious need for a key accu-pressure system the present invention has been designed. A plurality of sensation needles is attached to the upper surface of the keys. The sensation needles have a conical shape, an interior tip angle, a needle point and a needle shaft. The interior tip angle of the needle point is less than about 60 degrees, thus creating a sharp point that stimulates the neurological accu-pressure points of the users finger. Prior designs have failed to include an upper surface of the key or needle point that is sufficiently pointed to create an invigorating effect upon the user. Many of the prior art designs have intended to cushion and soften the effect of striking the keys and to this purpose have been designed with projections that are pliable with rounded surfaces. The key accu-pressure system is intended to produce a different effect where the sharpness and rigidity of the sensation needle is sufficient to indent or protrude into the user's finger skin surface and produce an accu-pressure stimulation.

The present embodiment has the sensation needles designed to be attached to a surface. The surface may be a new key, a key cap for an existing key on a keyboard, keyboard cover, stick-on pad or other item. The various versions of the key accu-pressure system allow the user ease and flexibility in modifying her existing systems to provide the enhanced capability of neurological accu-pressure stimulation.

The keys have alpha-numeric symbols, an upper surface, an outer edge of the upper surface, a plurality of sides, and a bottom surface. When the sensation needles are arranged in the configuration of the alphanumeric symbols, the sensation needles provide the user increased recognition of which key she is striking. The finger tips have a slight recognition of the configuration taken by the sensation needles, which corresponds to the alpha-numeric symbol of that particular key.

The bottom surface of a key cap can be attached to the existing keys of a keyboard, such that the needle points face generally upward and impact fingers of a user when the keys are struck by the fingers, which creates an accu-pressure effect upon the fingers of the user and relieves finger stress.

The key cap or stick-on pad may be attached to an existing key using an adhesive tape that is adhesive on both the top and bottom surface, a sticky substance, beads attached to the bottom surface of the key cap where the beads contain glue with the beads breaking and dispensing the glue when pressure is applied, Velcro™, or other known methods.

The length of the sensation needles may vary and materials of various stiffness or density can be utilized to create differing degrees of intrusion into the skin of the users finger. Some users will prefer to not even be aware of their fingers touching sensation needles and will simply experience an invigorating and beneficial effect.

The surface can be a stick-on pad having an upper surface, an outer edge of the upper surface, and a bottom surface. The stick-on pad has a bottom surface that is designed to be attached to an existing key of an existing keyboard.

In one embodiment the stick-on pad is flexible and has an adhesive bottom surface that allows easy application to an existing key on a keyboard or other surfaces. The flexibility of the stick-on pad allows it to adhere to curved or uneven surfaces that are not flat. The stick-on pad can be in a non-adhesive version, where the user would apply their own glue, adhesive or other attachment method.

The height of the sensation needles may vary so that a greater effect is felt. When the sensation needles are of minimal height, center located and low to the top surface of a concave key, then the edge of the key may absorb some of the force of the finger striking the key and the reduce the penetration of the sensation needles into the skin of the user.

Therefore, there is a need for a key accu-pressure system designed to release finger fatigue of the keyboard user by accu-pressure effect. The present invention is designed to fulfill this need.

BRIEF DESCRIPTION OF THE DRAWINGS

FIG. 3 shows a side profile view of the sensation needles on a stick-on pad.

FIG. 4 illustrates a side profile view of the sensation needles on a keyboard cover, placed over an existing keyboard.

FIG. 5 shows a side profile view of a concave key.

FIG. 6 is a top view of sensation needles arranged as an alpha-numeric symbol.

FIG. 7 illustrates a side profile view of sensation needles arranged as an alpha-numeric symbol.

FIG. 8 is a top view of sensation needles arranged around the outer edge of the surface.

FIG. 9 is a top view of sensation needles arranged around the outer edge of the surface and arranged as an alpha-numeric symbol.

DESCRIPTION

Figure 1:
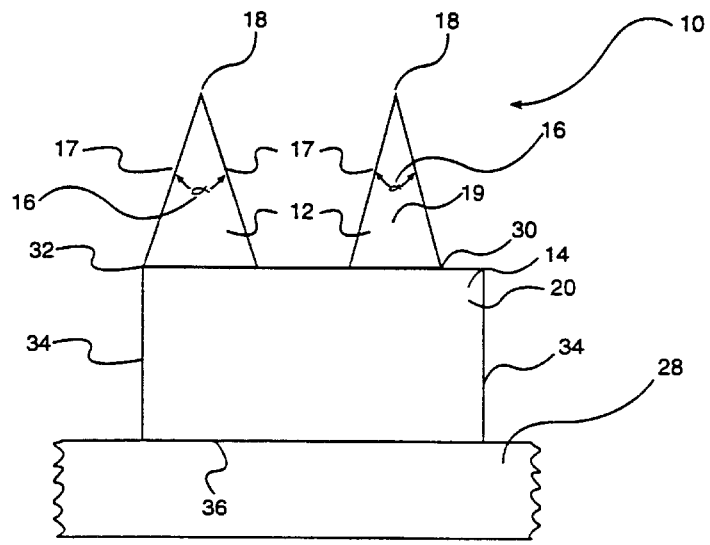
FIG. 1 shows a side profile view of the sensation needles upon a key.

Referring to FIGS. 1–9, a key accu-pressure system 10 includes a single sensation needle 12 or a plurality of sensation needle 12 attached to a surface 14. The sensation needles 12 have a conical shape, an interior tip angle α, 16, needle sides 17 a needle point 18 and a shaft 19.

The interior tip angle α, 16 is the angle formed between the needle sides 17 of the sensation needle 12. The interior tip angle α, 16 is less than about 60 degrees and is maintained to the needle point 18. The surface 14 can vary with various embodiments of the invention where the surface 14 is a key 20, keyboard cover 22, key cap 24 or stick-on pad 26.

FIG. 1 illustrates the key 20 attached to a keyboard 28. The key 20 has an upper surface 30, an outer edge 32 of the upper surface 30, a plurality of sides 34 and a bottom surface 36.

The plurality of needle points 18 face generally upward and impact the finger or fingers of a user when the key 20 is struck by the fingers, thereby creating an accu-pressure effect upon the fingers of the user, thereby relieving finger stress. FIG. 5 shows a variation where the upper surface 30 of the key 20 is concave and the plurality of needle points 18 are perpendicular to the concave upper surface 30.

Referring particularly to FIGS. 6–9, the surface 14 includes an alpha-numeric symbol 38 with the plurality of sensation needles 12 placed on the key 20, key board cover 22, key cap 24 or stick-on pad 26 in the configuration of the alpha-numeric symbol 38. The sensation needles 12 can also be placed around the outer edge 32 of the key 20 or the sensation needles 12 can be arranged in other configurations upon various surface 14. Combinations may be done where the sensation needles 12 can be placed on the surface 14 in the configuration of both the alpha-numeric symbol 38 and around the outer edge 32 of the key 20 or the surface 14.

Figure 2:
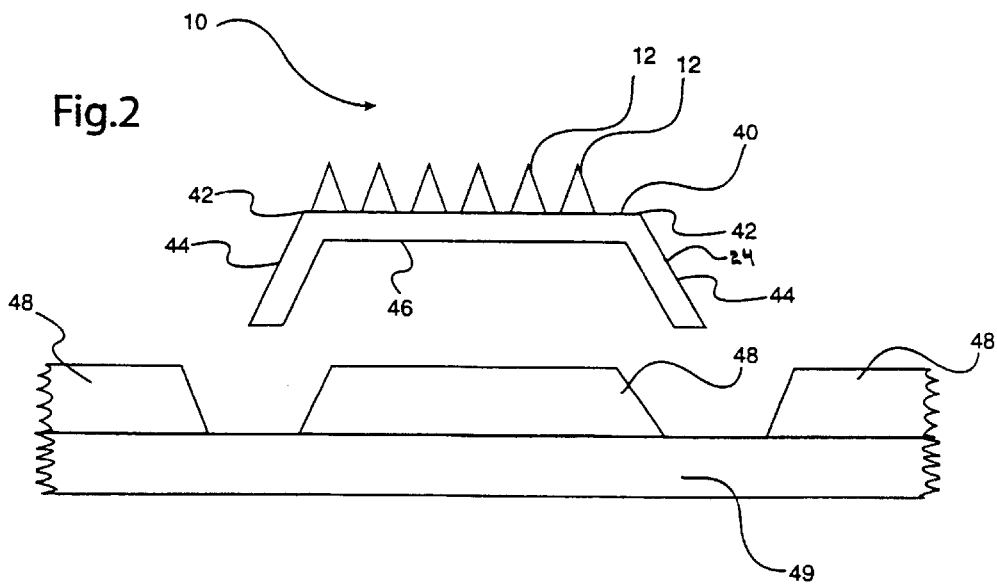
FIG. 2 shows a side profile view of the sensation needles on a key cap being placed on an existing key.

Referring to FIG. 2 the key cap 24 includes an upper surface 40, an outer edge 42 of the upper surface 40, a plurality of sides 44 and a bottom surface 46. The bottom surface 46 is designed to be attached to an existing key 48 of an existing keyboard 49.

Referring to FIG. 3, when the surface 14 is a stick-on pad 26, the stick-on pad 26 has sensation needles 12, an upper surface 50, an outer edge 52 of the upper surface 50, and a bottom surface 56. The bottom surface 56 of the stick-on pad is designed to be attached to an existing key 48 of an existing keyboard 49.

Referring to FIG. 4, a keyboard cover 22 can also serve as the surface. The keyboard cover has an upper surface 60 and a lower surface 62. The keyboard cover 22 is formed from a flexible material and shaped so the keyboard cover 22 emulates an existing keyboard 49 and can be placed over or attached to an existing keyboard 49. The flexible material allows the user to press upon the sensation needles 12 of the keyboard cover 22 or upon the keyboard cover 22 itself and actuate the existing keys 48 of an existing keyboard 49 that are underneath the keyboard cover 22. The plurality of needle points 18 impact the fingers of a user when the sensation needles 12 on the keyboard cover 22 are struck by the fingers, thereby creating an accu-pressure effect upon the fingers of the user, thereby relieving finger stress.

The sensation needles 12 can be arranged in various configuration upon the keyboard cover 22, including in the configuration of the alpha-numeric symbol 38 and other sensation needles 12 placed on the upper surface 60 of the keyboard cover 22 generally above the outer edge 64 of the existing key 48.

Although the present invention has been described in considerable detail with regard to the preferred versions thereof, other versions are possible. Therefore, the appended claims should not be limited to the descriptions of the preferred versions contained herein.

What is claimed is:

1. A key accu-pressure system comprising: a plurality of sensation needles attached to a surface, the sensation needles having a conical shape, an interior tip angle, a needle point and a shaft;

wherein, the interior tip angle is less than about 60 degrees, and the interior tip angle is maintained to the needle point, the surface is a key, the key is attached to a keyboard, the key having an upper surface, an outer edge of the upper surface, a plurality of sides and a bottom surface;

whereby the plurality of needle points face generally upward and impact fingers of a user when the keys are struck by the fingers, thereby creating an accu-pressure effect upon the fingers of the user, thereby relieving finger stress.

2. The key accu-pressure system of claim 1, wherein the upper surface of the key is concave and the plurality of sensation needles are perpendicular to the concave upper surface.

3. The key accu-pressure system of claim 1, the key having an alpha-numeric symbol, wherein the plurality of sensation needles are placed on the key in the configuration of the alpha-numeric symbol.

4. The key accu-pressure system of claim 1, wherein the plurality of sensation needles are placed around the outer edge of the key.

5. The key accu-pressure system of claim 1, the key having a alpha-numeric symbol, wherein the plurality of sensation needles are placed on the key in the configuration of the alpha-numeric symbol and the plurality of sensation needles are placed around the outer edge of the key.

6. A key accu-pressure system comprising: a plurality of sensation needles attached to a surface, the sensation needles having a conical shape, an interior tip angle, a needle point and a shaft;

wherein, the interior tip angle is less than about 60 degrees, and the interior tip angle is maintained to the needle point, the surface is a key cap, the key cap having an upper surface, an outer edge of the upper surface, a plurality of sides and a bottom surface; and the bottom surface is designed to be attached to an existing key of an existing keyboard;

whereby the plurality of needle points face generally upward and impact fingers of a user when the sensation needles on the key cap are struck by the fingers, thereby creating an accu-pressure effect upon the fingers of the user, thereby relieving finger stress.

7. The key accu-pressure system of claim 6, the key cap having an alpha-numeric symbol, wherein the plurality of sensation needles are placed on the key cap in the configuration of the alpha-numeric symbol.

8. The key accu-pressure system of claim 6, wherein the plurality of sensation needles are placed around the outer edge of the key cap.

9. The key accu-pressure system of claim 6, the key cap having an alpha-numeric symbol, wherein the plurality of sensation needles are placed on the key cap in the configuration of the alpha-numeric symbol and the plurality of sensation needles are placed around the outer edge of the key cap.

10. A key accu-pressure system comprising: a plurality of sensation needles attached to a surface, the sensation needles having a conical shape, an interior tip angle, a needle point and a shaft;

wherein, the interior tip angle is less than about 60 degrees, and the interior tip angle is maintained to the needle point, the surface is a stick-on pad having an upper surface, an outer edge of the upper surface, and a bottom surface; and the bottom surface is designed to be attached to an existing key of an existing keyboard;

whereby the plurality of needle points face generally upward and impact fingers of a user when the needle points on the stick-on pad are struck by the fingers, thereby creating an accu-pressure effect upon the fingers of the user, thereby relieving finger stress.

11. The key accu-pressure system of claim 10, the stick-on pad having an alpha-numeric symbol, wherein the plurality of sensation needles are placed on the stick-on pad in the configuration of the alpha-numeric symbol.

12. The key accu-pressure system of claim 10, wherein the plurality of sensation needles are placed around the outer edge of the stick-on pad.

13. The key accu-pressure system of claim 10, the stick-on pad having an alpha-numeric symbol, wherein the plurality of sensation needles are placed on the stick-on pad in the configuration of the alpha-numeric symbol and the plurality of sensation needles are placed around the outer edge of the stick-on pad.

14. A key accu-pressure system comprising: a plurality of sensation needles attached to a surface, the sensation needles having a conical shape, an interior tip angle, a needle point and a shaft;

wherein, the interior tip angle is less than about 60 degrees, and the interior tip angle is maintained to the needle point, the surface is a keyboard cover having an upper surface and a lower surface, the keyboard cover formed from a flexible material and shaped so the keyboard cover emulates an existing keyboard and can be placed over an existing keyboard, whereby the user can press upon the sensation needles of the keyboard cover or upon the keyboard cover and actuate the existing keys of an existing keyboard that are underneath the keyboard cover;

whereby the plurality of needle points face generally upward and impact fingers of a user when the needle points on the keyboard cover are struck by the fingers, thereby creating an accu-pressure effect upon the fingers of the user, thereby relieving finger stress.

15. The key accu-pressure system of claim 14, the keyboard cover having an alpha-numeric symbol, wherein the plurality of sensation needles are placed on the keyboard cover in the configuration of the alpha-numeric symbol.

16. The key accu-pressure system of claim 14, wherein the plurality of sensation needles are placed on the upper surface of the keyboard cover generally above the outer edge of the existing key.

17. The key accu-pressure system of claim 14, the keyboard cover having an alpha-numeric symbol, wherein the plurality of sensation needles are placed on the keyboard cover in the configuration of the alpha-numeric symbol and the plurality of sensation needles are placed on the upper surface of the keyboard cover generally above the outer edge of the existing key.

\* \* \* \* \*